US006836331B2

(12) United States Patent
Reis et al.

(10) Patent No.: US 6,836,331 B2
(45) Date of Patent: Dec. 28, 2004

(54) APPARATUS FOR DETECTION OF FORMAT ACCURACY OF A WEB OF CORRUGATED BOARD

(75) Inventors: Christoph Reis, Etzenricht (DE); Hermann-Josef Mensing, Weiherhammer (DE); Reinhard Sternitzke, Kaltenbrunn (DE); Karl Ruhland, Pfreimd (DE)

(73) Assignee: BHS Corrugated Maschinen-und Anlagenbau GmbH, Weiherhammer (DE)

( * ) Notice: Subject to any disclaimer, the term of this patent is extended or adjusted under 35 U.S.C. 154(b) by 0 days.

(21) Appl. No.: 10/322,765

(22) Filed: Dec. 19, 2002

(65) Prior Publication Data

US 2003/0137667 A1 Jul. 24, 2003

Related U.S. Application Data

(63) Continuation-in-part of application No. 09/714,133, filed on Nov. 14, 2000, now abandoned.

(30) Foreign Application Priority Data

Nov. 20, 1999 (DE) ........................................ 199 55 916

(51) Int. Cl.$^{7}$ ................................................ G01B 11/06

(52) U.S. Cl. ........................ 356/429; 356/381; 356/237

(58) Field of Search ................................ 356/429, 381, 356/237, 373; 250/560, 559.45; 73/865.8

(56) References Cited

U.S. PATENT DOCUMENTS

| | | | |
|---|---|---|---|
| 3,671,726 A | 6/1972 | Kerr | |
| 5,210,593 A | * 5/1993 | Kramer | 356/631 |
| 5,271,284 A | * 12/1993 | Still et al. | 73/865.8 |
| 5,581,353 A | * 12/1996 | Taylor | 356/631 |
| 5,632,850 A | 5/1997 | Knorr et al. | |
| 5,857,395 A | 1/1999 | Bohm et al. | |

FOREIGN PATENT DOCUMENTS

| | | |
|---|---|---|
| DE | 30 45 951 A1 | 9/1981 |
| DE | 34 19 524 A1 | 11/1985 |
| GB | 2 305 675 | 9/1996 |

* cited by examiner

*Primary Examiner*—John R. Lee
*Assistant Examiner*—Zia R. Hashmi
(74) *Attorney, Agent, or Firm*—Browdy and Neimark, P.L.L.C.

(57) ABSTRACT

An apparatus for detection of format accuracy of a web of corrugated board that comprises a first and second smooth liner and a corrugated paper web disposed there-between, is equipped with at least one sensor which detects grooves running in a conveying direction of the web of corrugated board, and/or a lengthwise cut, and/or lateral edges.

8 Claims, 1 Drawing Sheet

APPARATUS FOR DETECTION OF FORMAT ACCURACY OF A WEB OF CORRUGATED BOARD

This is a continuation-in-part of parent application Ser. No. 09/714,133, filed Nov. 14, 2000 now abandoned.

BACKGROUND OF THE INVENTION

1. Field of the Invention

The invention relates to an apparatus for detection of accuracy of format of a web of corrugated board moved in a conveying direction and comprising a first and a second smooth liner; and at least one corrugated paper web disposed between the liners; several profiled patterns running in the conveying direction, namely lateral edges, and at least one lengthwise cut, which divides the web of corrugated board into partial webs, and/or at least one groove.

2. Background Art

Facilities for the manufacture of webs of corrugated board, in particular for the manufacture of single-faced webs of corrugated board which consist of a corrugated paper web and a liner, are generally known for instance from U.S. Pat. No. 5,632,850 or GB 2,305,675 A. In machines of the generic type, lots of conceivable malfunctions may cause the quality of the corrugated board not to correspond to standard production; for example the truth to format of a web of corrugated board i.e., the position of its lengthwise edges and/or the position of a groove and/or the position of a lengthwise cut may be out of order.

SUMMARY OF THE INVENTION

It is an object of the invention to embody an apparatus of the generic type for detection of the accuracy of format of the web of corrugated board to be possible.

According to the invention, this object is attained by the features which consist in that at least one sensor is provided for the detection of the position of at least two profiled patterns relative to each other, which sensor is in working connection with an evaluation equipment for determination of the distance of the at least two profiled patterns from each other. By detecting the accuracy of format of a web of corrugated board, it is possible continuously to detect and monitor the quality of the finished web of corrugated board and possibly to correct the quality by intervention in the manufacturing process or to cut out and eliminate faulty parts.

Further features, advantages and details of the invention will become apparent from the ensuing description of an exemplary embodiment of the invention, taken in conjunction with the drawing.

DESCRIPTION OF THE PREFERRED EMBODIMENTS

Figure 1:
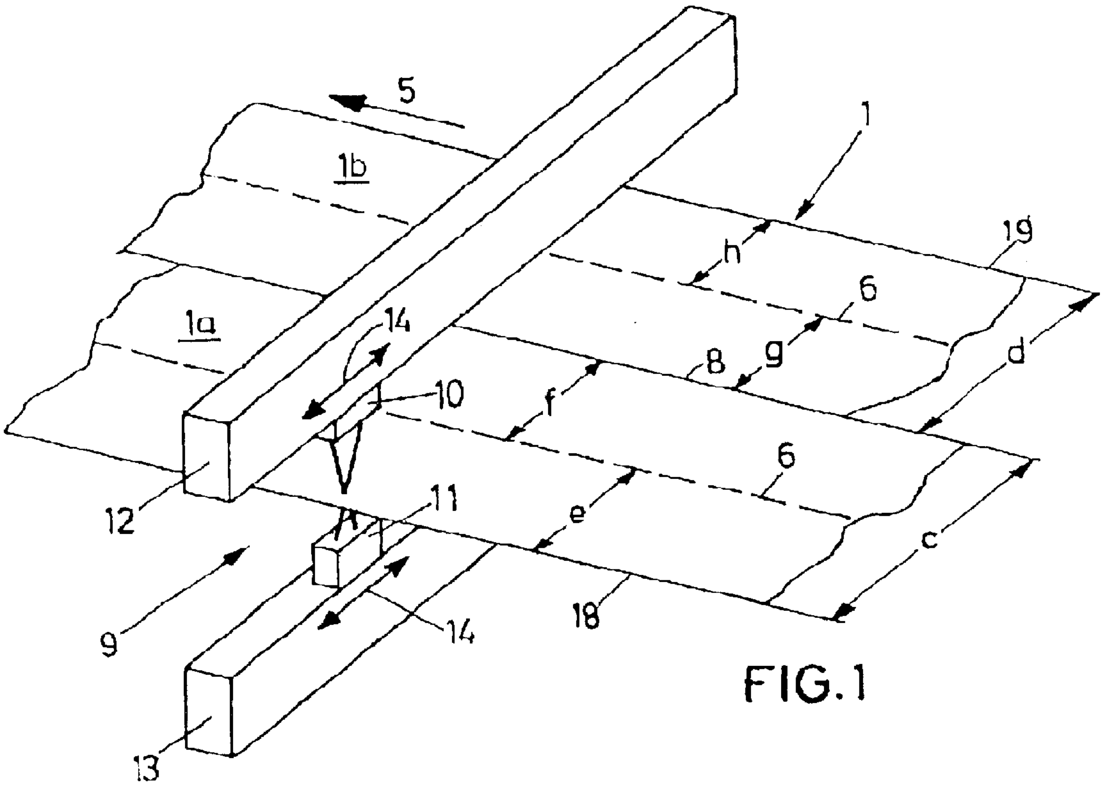
FIG. 1 is a perspective diagrammatic illustration of a quality-detecting apparatus.
Figure 2:
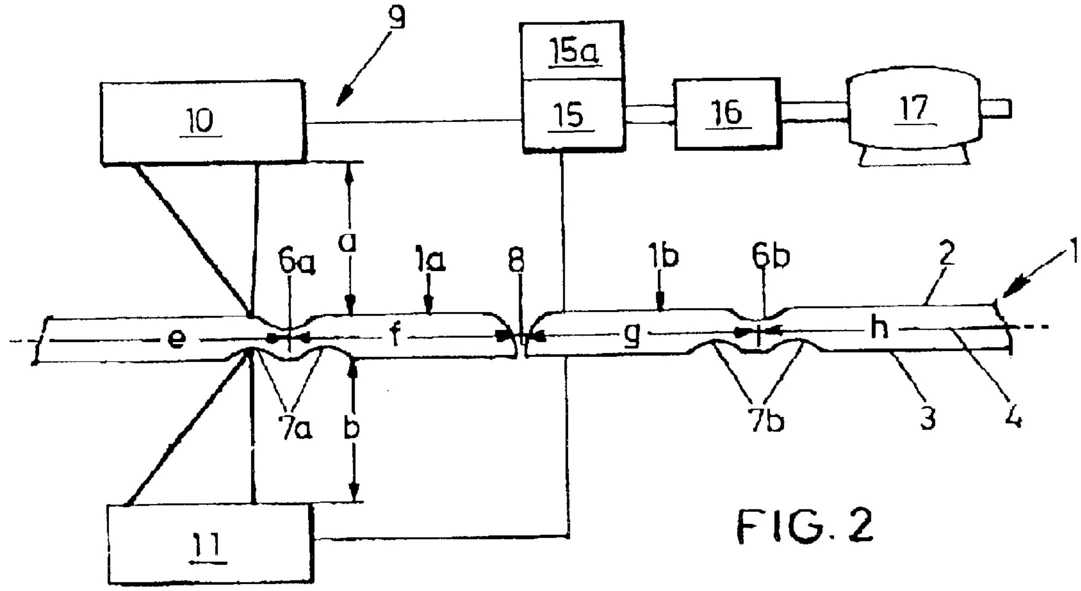
FIG. 2 is a cross-sectional illustration of the quality-detecting apparatus.

FIGS. 1 and 2 diagrammatically illustrate a web of corrugated board 1, which comprises a first upper liner 2 and a second lower liner 3—each of paper—and a corrugated paper web 4 disposed between the liners 2, 3 and united there-with by gluing. In the course of its manufacture, the web of corrugated board 1 is located on a facility for the manufacture of corrugated board—seen in the conveying direction 5—downstream of a grooving and longitudinal cutting arrangement as illustrated and specified for instance in U.S. Pat. No. 5,857,395, to which reference is made explicitly. In this arrangement, the upper liner 2 has been equipped with upper grooves 6 that run in the conveying direction 5 and the lower liner 3 has been equipped with lower grooves 7*a*, 7*b* that are allocated to the upper grooves 6*a*, 6*b*. Furthermore, in this arrangement, the web of corrugated board 1 has been provided with a lengthwise cut 8 running in the conveying direction 5 and dividing the web of corrugated board 1 into two partial webs 1*a*, 1*b* of a width a and d, respectively, As seen in FIGS. 1 and 2, the web of corrugated board 1, which has been divided into two partial webs 1*a, b*, passes through a first quality-detecting apparatus 9 that has two laser sensors 10, 11 disposed above and below the web of corrugated board 1. They are synchronously displaceable crosswise of the conveying direction 5 and crosswise of the corrugated board 1 on guides 12, 13 by means of drives (not shown), which is roughly outlined by the double-headed arrow 14 in FIG. 1. The laser sensor 10 detects the distance a from the upper liner 2; the lower laser sensor 11 detects the distance b from the lower liner 3. If the sensors 10, 11, upon crosswise displacement, move over the upper groove 6*a* and 6*b*, respectively, or the lower groove 7*a* and 7*b*, respectively, they detect any change in the distance a and b, respectively, which means they detect the position of the grooves 6*a*, 6*b* and 7*a*, 7*b*, respectively, crosswise of the conveying direction 5. In the same way, they detect the position of the lengthwise cut 8 and the position of the lateral edges 18, 19. Detecting the grooves 6*a*, 6*b*, 7*a*, 7*b* and the lengthwise cut 8 and the lateral edges 25, 26 helps determine whether their position relative to each other is correct.

The distances a and b found by the laser sensors 10, 11 are fed to an evaluation equipment 15. This is where the distance of the lateral edge 18 of the partial web 1*a* from the lengthwise cut 8 i.e., the width c of the partial web 1*a*, is determined. The distance of the lengthwise cut 8 from the lateral edge 19 of the partial web 1*b* i.e., the width d thereof, is determined in the same way. Furthermore, the distance e of the grooves 6*a*, 7*a* from the lateral edge 18 and/or the distance f of The grooves 6*a*, 7*a* of the partial web 1*a* from the lengthwise cut 8 is determined. The same applies to the distance g of tie grooves 6, 7*b* of the partial web 1*b* from the lengthwise cut 8 and to the distance h of the grooves 6*b*, 7*b* from the lateral edge 19 of the partial web 1*b*. A display unit 15*a* may be allocated to the evaluation equipment 15. Via a control equipment 16, which is disposed downstream of the evaluation equipment 15, the evaluated information on the position can then be employed for triggering the mentioned grooving and longitudinal cutting arrangement. Furthermore, the control equipment 16 triggers an electric motor 17, for instance the driving motor of a cross cutter which is disposed downstream in the conveying direction 5 in the facility and by means of which a section of the web is cut out that has been detected as being out of order. Such a section is eliminated in a turnout that is disposed downstream of the cross cutter. These details too become apparent from U.S. Pat. No. 5,857,395 which has already been mentioned and which reference is made to explicitly.

What is claimed is:

1. An apparatus for detection of accuracy of format of a web of corrugated board (1) moved in a conveying direction (5) and wherein the web comprises a first and a second smooth liner (2, 3); and at least one corrugated paper web (4) disposed between the liners (2, 3);

several profiled patterns running in the conveying direction (5), including lateral edges (18, 19), and at least one of at least one lengthwise cut (8), which divides the web of corrugated board (1) into partial webs (1*a*, 1*b*), and at least one lengthwise groove (6*a*, 6*b*; 7*a*, 7*b*);

wherein said apparatus comprises at least one sensor (10, 11) displaceable crosswise of the conveying direction (5) for the detection of the position of at least two of said profiled patterns relative to each other, which sensor (10, 11) is in working connection with an evaluation equipment (15) for determination of the distance (c, d; e, f; g, h) of said at least two profiled patterns from each other, and wherein a control equipment (16) is in working connection with the evaluation equipment (15).

2. An apparatus according to claim 1, wherein the at least one sensor (10, 11) is a sensor of non-contact operation.

3. An apparatus according to claim 2, wherein on both sides of the web of corrugated board (1), two sensors (10, 11) are disposed, a first sensor (10) of which being designed to measure the distance a of the first liner (2) from the first sensor (10); and a second sensor (11) of which being designed to measure the distance b of the second liner (3) from the second sensor (11).

4. An apparatus according to claim 3, wherein the sensors are laser sensors (10, 11).

5. An apparatus according to claim 3, wherein the sensors (10, 11) are designed for synchronous displacement crosswise of the conveying direction (5) of the web of corrugated board (1).

6. An apparatus according to claim 1, wherein a display unit (15*a*) is allocated to the evaluation equipment (15).

7. A quality-detecting apparatus for detection of accuracy of format of a web of corrugated board (1) moving in a conveying direction (5), comprising at least one sensor (10, 11) provided for the detection of position relative to one another of at least two longitudinally extending profiled patterns in at least one surface of the moving web of corrugated board, said at least one sensor being adapted to move laterally widthwise relative to the conveying direction of the web of corrugated board, and an evaluation equipment (15) for receipt of information from said at least one sensor and for determination of a distance apart of the at least two profiled patterns.

8. A quality-detecting apparatus for detection of accuracy of format of a web of corrugated board (1) moving in a conveying direction (5), comprising at least one sensor (10, 11) provided for the detection of position relative to one another of at least two longitudinally extending profiled patterns in at least one surface of the moving web of corrugated board, said at least one sensor being movable laterally widthwise relative to the conveying direction of the web of corrugated board, an evaluation means (15) for evaluating information on relative positions of the at least two profiled patterns received from said at least one sensor, and a control equipment (16) downstream of said evaluation means and adapted to trigger changes in at least one of longitudinal grooving and longitudinal cutting of the moving web of corrugated board.

* * * * *